(12) United States Patent
Marioni

(10) Patent No.: US 8,551,384 B2
(45) Date of Patent: Oct. 8, 2013

(54) PERMANENT-MAGNET ROTOR FOR AN EXTERNAL-ROTOR ELECTRIC MOTOR PARTICULARLY FOR WASHING MACHINES AND SIMILAR HOUSEHOLD APPLIANCES AND RELEVANT MANUFACTURING METHOD

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 550 days.

(21) Appl. No.: 11/466,973

(22) Filed: Aug. 24, 2006

(65) Prior Publication Data

US 2007/0046123 A1 Mar. 1, 2007

(30) Foreign Application Priority Data

Aug. 30, 2005 (EP) .................................... 05425604

(51) Int. Cl.
*B29B 13/00* (2006.01)
(52) U.S. Cl.
USPC ........ 264/271.1; 264/251; 264/259; 264/261; 264/262; 264/263; 264/267; 264/268; 264/272.13; 264/272.2; 264/277; 264/279; 264/279.1
(58) Field of Classification Search
USPC .............. 264/271, 272.2, 402, 405, 427, 429, 264/264/611, 650, 478, 645, 271.1, 251, 264/259, 261, 262, 263, 267, 268, 272.13, 264/277, 279, 279.1
See application file for complete search history.

(56) References Cited

U.S. PATENT DOCUMENTS

| | | | | |
|---|---|---|---|---|
| 3,221,194 A * | 11/1965 | Blackburn | ............... | 310/156.51 |
| 4,120,618 A * | 10/1978 | Klaus | ............................. | 417/420 |
| 4,573,258 A * | 3/1986 | Io et al. | .............................. | 29/596 |
| 4,647,803 A * | 3/1987 | von der Heide et al. | ......... | 310/51 |
| 5,201,111 A * | 4/1993 | Prohaska | ......................... | 29/596 |
| 5,627,423 A * | 5/1997 | Marioni | ................... | 310/156.23 |
| 6,160,331 A * | 12/2000 | Morreale | ......................... | 310/51 |
| 2004/0207274 A1* | 10/2004 | Ewert et al. | ..................... | 310/51 |

\* cited by examiner

*Primary Examiner* — Jeffrey Wollschlager
*Assistant Examiner* — Stella Yi
(74) *Attorney, Agent, or Firm* — Akerman Senterfitt

(57) ABSTRACT

A permanent-magnet rotor for external-rotor electric motor (1) particularly for washing machines of unusual silence comprising a cup-shaped support structure (6) having a bottom (7) and a side wall (10) and a plurality of magnetic poles (12) arranged in the support structure (6) and arranged along said side wall (10), with elastomeric material interposed between said magnetic poles (12) which forms with them a massive structure (14) of uniform thickness.

7 Claims, 5 Drawing Sheets

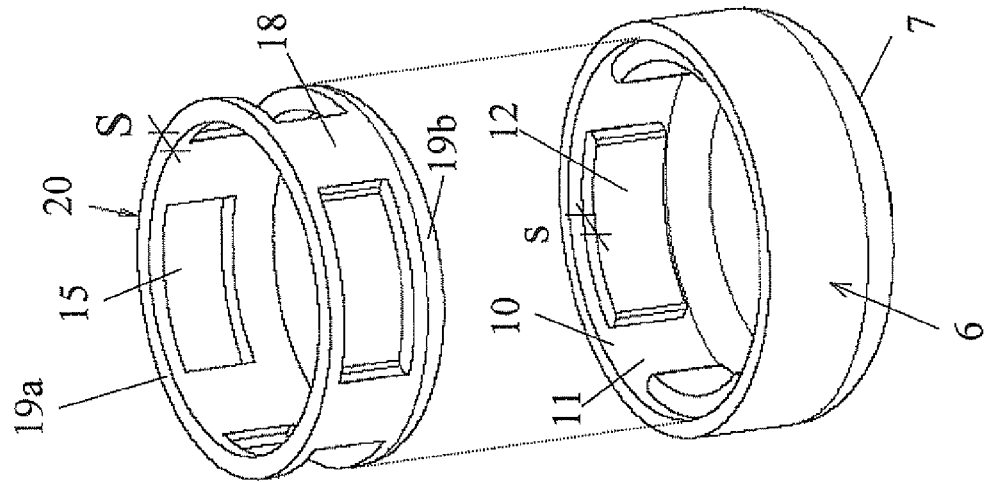
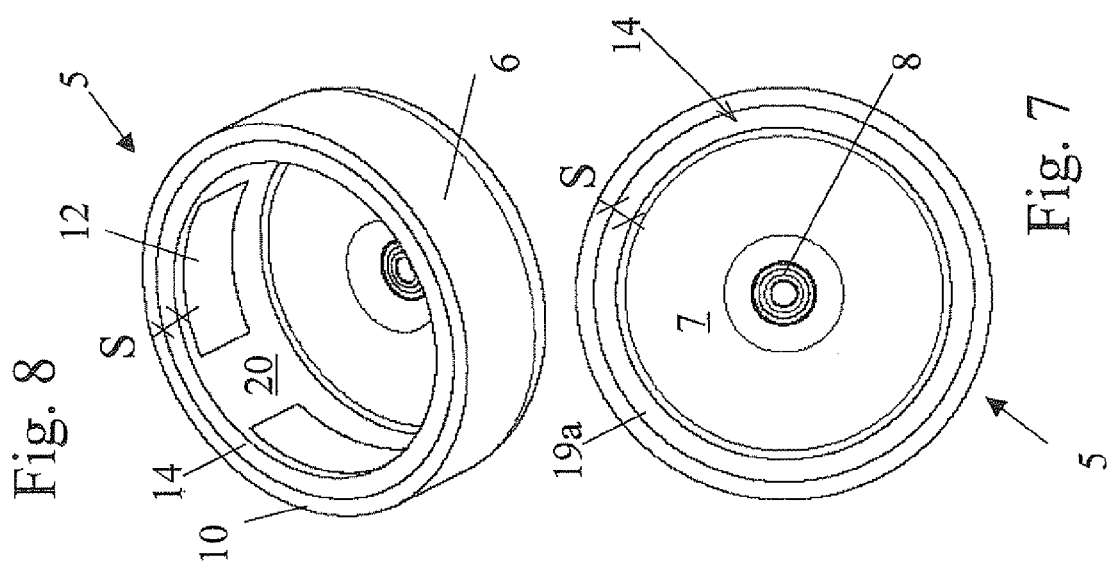

PERMANENT-MAGNET ROTOR FOR AN EXTERNAL-ROTOR ELECTRIC MOTOR PARTICULARLY FOR WASHING MACHINES AND SIMILAR HOUSEHOLD APPLIANCES AND RELEVANT MANUFACTURING METHOD

FIELD OF APPLICATION

The present invention refers to a permanent-magnet rotor for an external-rotor electric motor particularly for washing machines and similar household appliances.

More in particular the present invention regards a permanent-magnet rotor for an external-rotor electric motor comprising a cup-shaped support structure having a bottom and a side wall, and a plurality of magnetic poles arranged in the support structure and distributed along the side wall.

The present invention also regards a method for manufacturing the aforesaid permanent-magnet rotor for an external-rotor electric motor.

PRIOR ART

As is well known, in the specific technical sector of washing machines for domestic and industrial use it is necessary to use electric motors with low acoustic emission to reduce the noise produced during all the operation steps of such machines: from the washing to the spin-drying.

In particular, there is the attempt to reduce the acoustic emission above all when the motor operates at high velocity, as for example near 16,000 turns/min.

In the case of an external-rotor electric motor, to which the invention refers, the motor comprises a permanent-magnet rotor axially and externally mounted onto a respective inner stator equipped with a plurality of stator poles. The rotor comprises a cup-shaped support structure having a bottom and a side wall and a plurality of magnetic poles arranged in the support structure, distributed along the side wall and facing the stator.

The magnetic poles of the rotor are generally realised through co-moulding with the support structure or through association therewith by means of appropriate adhesives and they are circumferentially spaced by empty sections of predetermined width.

The external-rotor electric motors, schematically described, exhibit an acoustic emission during the rotor rotation due to the polar exchange between the magnetic poles and the stator poles, which generates vibrations on the rotor (cogging torque).

It has moreover been verified that the rotor acoustic emission is influenced by the rotor "aeroacoustic" noise produced in particular by the passage of the empty sections, discontinuity between one magnetic pole and the other, before the stator poles.

To try and reduce the "aeroacoustic" noise produced by the rotor, the known technique teaches to interpose an insert, of magnetic or non-magnetic material, between one magnetic pole and the other.

Although advantageous, such solution is not exempt from drawbacks. In fact, such inserts little fit in the limited constructive tolerances of the rotor and in particular they exhibit imperfections both tangentially to the magnetic poles and radially to the rotor. Therefore, the presence of such inserts although reducing the noise produced by the rotor maintains the motor acoustic emission high and unacceptable.

External-rotor electric motors, as described above, have a further drawback linked to the resonance frequency of the entire motor system which worsens the noise produced and therefore the acoustic emission. In fact, in relation to the stiffness of the realised motor system, it is verified how at certain specific frequencies during the rotor operation, and in particular at the resonance frequency, the motor noise is amplified.

To try and lower the acoustic emission linked to the motor resonance, the known technique teaches to interpose a dampening layer, such as for example a strip of sound-absorbing material, between the inner surface of the support structure and the magnetic poles.

Such solution is not however exempt from drawbacks. In fact, the great vibratory power to be absorbed in combination with the limited rotor dimensions, which define reduced displacements of the rotor, make the sound-proofing power of the strip of interposed material inefficient.

The known technique then teaches, to overcome such drawback, to externally coat the rotor with a thick strip of rubbery material held by a metallic ring.

Although satisfactory, such solution exhibits some drawbacks. In fact, the high rotor speed makes the motor balancing very difficult, with the rotor coated by the strip of rubbery material, and, moreover the strip of rubbery material, in order to be efficient, must have a high thickness and this generates an excessive size.

The above indicated drawbacks therefore make such known solutions difficult to be realised on an industrial scale, in order to obtain a permanent-magnet rotor which exhibits a low manufacturing cost and may be used in products of wide consumption.

The technical problem underlying the present invention is that of devising a permanent-magnet rotor for an external-rotor electric motor having such structural and functional characteristics as to notably reduce the acoustic emission during all the rotation steps, allowing to overcome the drawbacks mentioned with reference to the known technique and such as to be manufactured at reduced prices.

SUMMARY OF THE INVENTION

The solution idea underlying the present invention is that of realising a permanent-magnet external rotor of the type specified which has a massive structure with uniform body free of cavities or protuberances.

On the basis of such solution idea, the technical problem is solved by a permanent-magnet rotor for external-rotor electric motor, of the type specified and characterised in that between said magnetic poles elastomeric material is interposed, which forms, with them, a substantially annular massive structure.

The invention also regards an electric motor with permanent-magnet external rotor as defined by claim 7.

The invention also regards a method for realising a permanent-magnet rotor for an external-rotor electric motor as defined by claim 12.

Further characteristics and advantages of the rotor, motor and method for realising a rotor according to the invention will be apparent from the following description of an embodiment thereof given by way of indicative and non limiting example with reference to the annexed drawings.

BRIEF DESCRIPTION OF THE DRAWINGS

In the drawings:

FIGS. 5 and 6 schematically represent, in a top view and a perspective view, a rotor with magnetic poles;

FIGS. 7 and 8 schematically represent, in a top view and in a perspective view, a rotor realised according to the present invention;

FIG. 9 represents, in an exploded ideal view, the rotor of FIG. 8.

DETAILED DESCRIPTION

With reference to the attached FIG. 8, a permanent-magnet rotor 5 is shown, realised according to the present invention.

Figure 2:
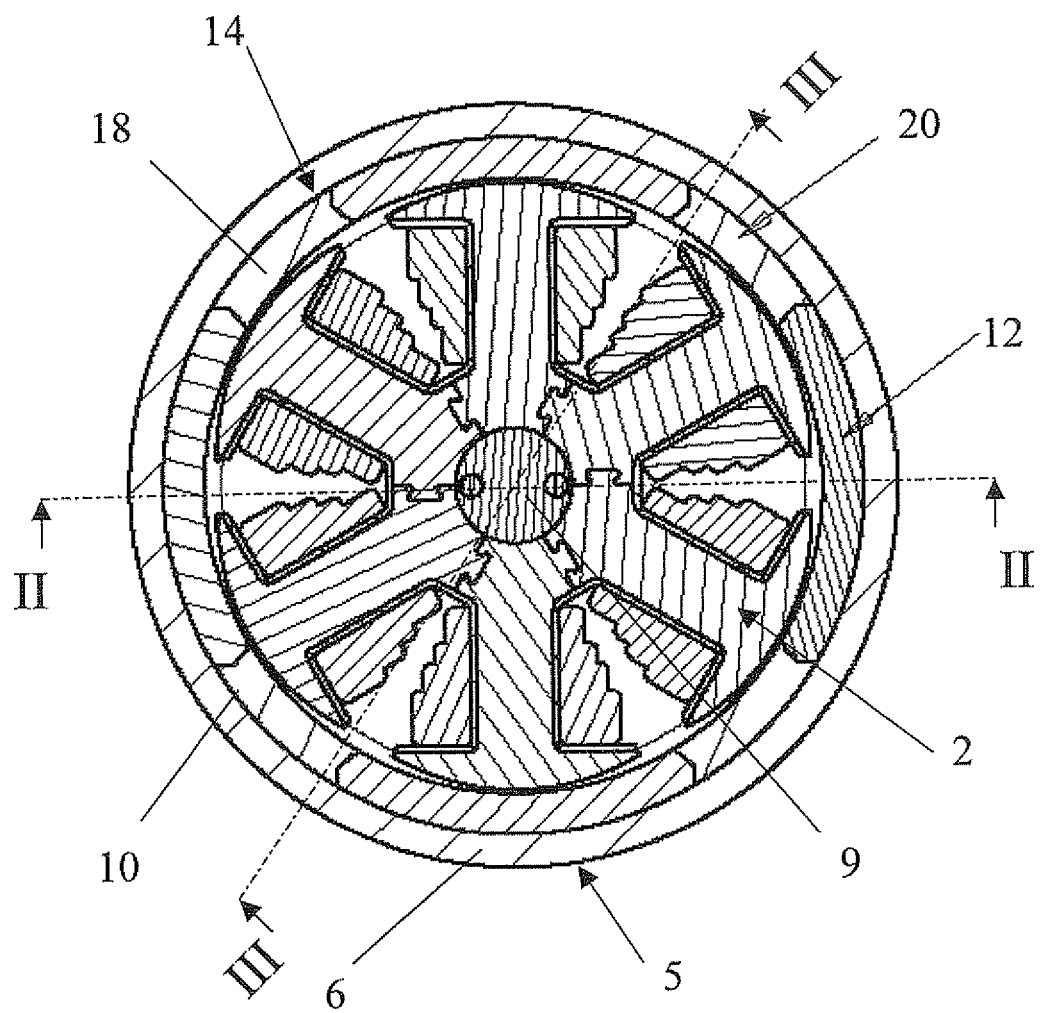
FIG. 2 represents a view of FIG. 1 along section line I-I.

The rotor 5 is adapted to be used in an electric motor 1 so-called with internal stator and external rotor, i.e. of the type wherein the rotor 5 is axially fitted with predetermined clearance on a stator structure 2, as indicated in FIG. 2.

The rotor 5, illustrated in the present invention, has a number of magnetic poles equal to four. Rotors may however be realised with a different and predetermined number of poles to be adequate to the number of statoric poles 3 of the stator 2.

Preferably, as shown in FIGS. 5 and 6, the rotor 5 exhibits a cup-shaped support structure 6 having a circular bottom 7 with a central hole 8 for the axial passage of a driving shaft 9.

From the bottom 7 a side wall 10 peripherally rises on which a plurality of magnetic poles 12 are circumferentially distributed, spaced from each other by a section 11.

The sections 11 are preferably, according to the present embodiment, of equal and predetermined width.

Essentially, the magnetic poles 12 are plate-like annular sectors formed by a curved layer of an appropriate permanent-magnet material, of thickness "s", and they are associated with the side wall 10 by means of an adhesive layer.

Advantageously, according to the present invention, between the magnetic poles 12, elastomeric material is circumferentially interposed forming with the poles 12 a massive structure 14.

The massive structure 14 is substantially annular, with uniform thickness.

The elastomeric material, in the liquid state, is cast onto an appropriate mould which exhibits at least one internal portion or core, inserted in the support structure 6 comprising the poles 12. The elastomeric material perfectly adapts to the space made available and it forms, further to a hardening process, a body 20 of shape matching the mould. The body 20 forms, with the poles 12, the massive structure 14 of annular, solid and continuous conformation.

Advantageously, the elastomeric material is cast into the mould at atmospheric pressure and room temperature, allowing to avoid an excessive impact on the glued magnets, which could be damaged.

Appropriately, according to a preferred embodiment illustrated in FIG. 7, the body 20 of the massive structure 14 has a uniform thickness "S" advantageously equal to the thickness "s" of the poles 12, thus maintaining the thickness of the air gap existing between rotor and stator constant.

In particular, as shown in FIG. 9, with the body 20 ideally dissociated from the poles 12, the body 20 comprises portions 18 matching sections 11 and two annular crowns, a lower 19a and an upper 19b one, which unite the portions 18 in a single element.

The body 20 of the massive structure 14 exhibits openings 15, matching the poles 12, which perfectly adhere to the side conformation of the poles 12, allowing the part facing the stator to remain uncovered.

Advantageously, the elastomeric material which defines the body 20 is for example a synthetic material and it is preferably a polyurethane rubber.

The body 20 and consequently the massive structure 14, depending on the conformation of the mould that will be inserted in the support structure 6 to contain the liquid elastomeric material, may have different shapes and in particular may exhibit defined and specific heights and thicknesses.

In particular, the massive structure 14 has uniform thickness equal to the thickness "S" of the body 20 which may be greater than the thickness "s" of the poles 12. In such case the poles 12 will be completely covered by the elastomeric material and contained within the structure 14.

Furthermore, the massive annular structure 14 of continuous, solid and uniform thickness, associated with the support structure 6, makes the rotor 5 particularly silent.

Figure 1:
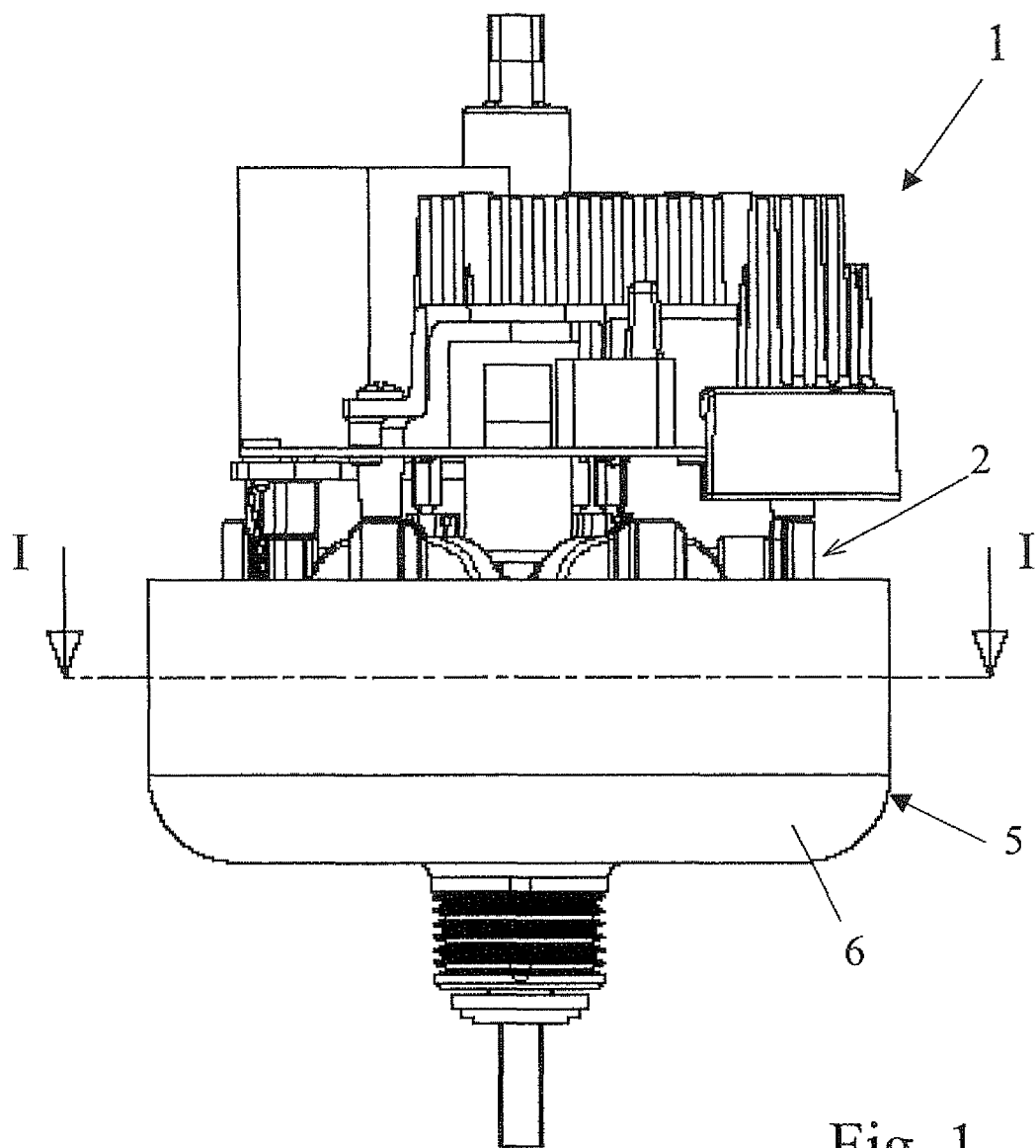
FIG. 1 schematically represents a side view of a motor realised according to the present invention.

The present invention further regards an electric motor 1, schematically illustrated in FIGS. 1 and 2, with a permanent-magnet rotor 5 externally and axially mounted onto a respective inner stator 2.

The structure of said stator 2 has a substantially cylindrical configuration crossed by an axial passage 4, also substantially cylindrical, of predetermined diameter, intended to be engaged by a driving shaft 9 for the fix support of the entire electric motor 1.

Figure 3:
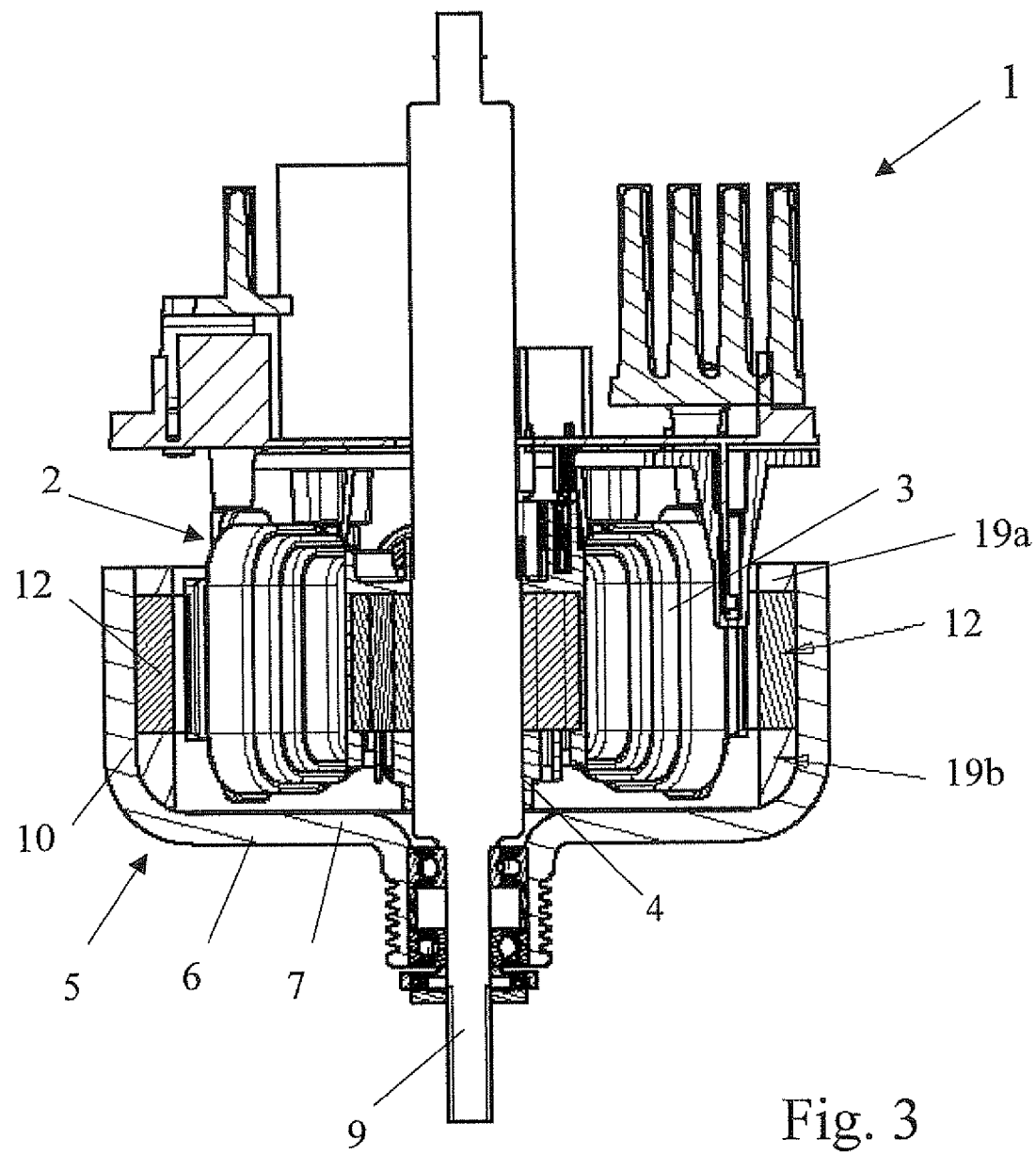
FIGS. 3 and 4 schematically represent views of the motor realised respectively along section lines II-II and III-III of FIG. 2.

The stator 2 comprises a plurality of stator poles 3, each defined, in a per se known way, by a corresponding plurality of equal sheets in mutual contact, as shown in FIG. 3.

The permanent-magnet external rotor 5 is fitted with predetermined clearance on the stator structure 2.

Figure 4:
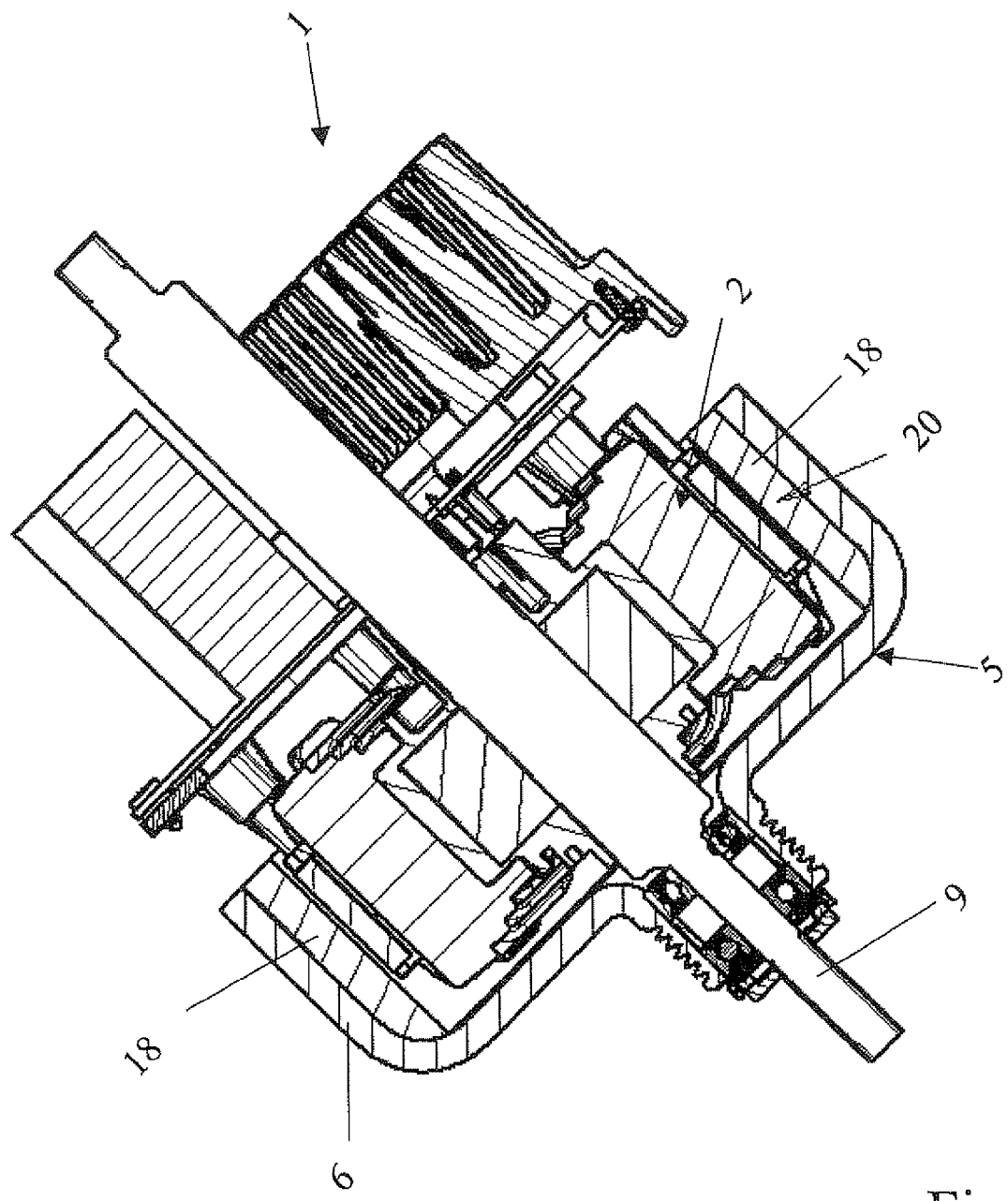

Preferably, as shown in FIGS. 3 and 4, the rotor 5 exhibits a cup-shaped support structure 6 having a circular bottom 7 with a central hole 8 for the axial passage of the driving shaft 9.

From the bottom 7 a side wall 10 peripherally rises on which a plurality of magnetic poles 12 are distributed, spaced from each other by a section 11 of predetermined and equal width.

In substance, as shown in FIG. 6, the magnetic poles 12 are annular plate-like sectors formed by a curved layer of an appropriate permanent magnetic material, of an appropriate thickness "s", and they are associated with the side wall 10 by means of an adhesive layer.

The rotor 5, according to a preferred embodiment, exhibits a number of magnetic poles equal to four. Rotors may however be realised with a different and predetermined number of poles for an adequate number of pole pieces 3 of the stator 2.

Advantageously, according to the present invention, between the magnetic poles 12, elastomeric material is circumferentially interposed, which forms, with them, a massive, substantially annular structure 14 of uniform thickness.

The elastomeric material, in the liquid state, is cast onto an appropriate mould which exhibits at least one portion within the support structure 6 to contain the poles 12. The elastomeric material perfectly adapts to the space made available and it forms, further to a hardening process, a body 20 matching the mould.

Advantageously, the elastomeric material is cast into the mould at atmospheric pressure and at room temperature, allowing to avoid an excessive impact on the glued magnets, which could be damaged. The body 20, as shown in FIG. 9, comprises portions 18 matching the parts 11, and connected by an upper ring 19a and by a lower ring 19b to define a single element. The body 20 exhibits openings 15, matching the poles 12, which perfectly adhere to the side conformation of the poles 12 allowing the part facing the stator to remain uncovered.

The body 20 with the poles 12 define the massive structure 14, as shown in FIG. 2.

Advantageously, in the present embodiment, the body 20 and, therefore, the massive structure 14, has a uniform thickness "S" substantially equal to the thickness "s" of the magnetic poles 12, thus maintaining the thickness of the air gap existing between rotor and stator constant.

Appropriately, the elastomeric material which defines the body 20 is for example a synthetic material and it is preferably a polyurethane rubber.

In a different embodiment, the body 20 may exhibit only the portions 18, or the portions 18 with one of the two upper 19a or lower 19b rings.

The rotor 5 thus realised allows to make the electric motor 1 particularly silent, in fact the continuous, solid and annular massive structure 14 of uniform thickness allows to reduce the acoustic emission while maintaining the motor unusually silent during all the operative functions of the washing machines and similar household appliances where the motor is installed.

The present invention further refers to a method for producing a rotor 5 for electric motor 1 with permanent-magnet rotor situated outside a central stator 2.

The method according to the present invention includes the step of providing a cup-shaped support structure 6 of rotor 5 having a bottom 7 and a side wall 10 and a plurality of poles 12 arranged in the support structure and distributed along the side wall 10, spaced from each other by a section 11 of predetermined width. The poles 12 are associated with the side wall 10 through the interposition of a glue.

The method includes therefore the step of providing a mould which exhibits at least one portion inserted in the support structure 6 to contain the poles 12.

Advantageously, the method according to the present invention provides the step of casting liquid elastomeric material between the support structure 6 and the mould, placing the elastomeric material in a specific way circumferentially between the magnetic poles 12, to define, further to an appropriate hardening, a massive, substantially annular structure 14 of uniform thickness which envelops the magnetic poles 12.

The liquid elastomeric material cast into the mould, advantageously at atmospheric temperature and room temperature, occupies all the space made available and it defines, further to a hardening process, a body 20 which is in mutual contact with the support structure 6 and with the side portions of each pole 12.

Alternatively, the elastomeric material may be injected into the mould at low pressure.

Advantageously, the body 20 exhibits a uniform thickness "S" substantially equal to the thickness "s" of the poles 12, thus maintaining the thickness of the air gap existing between rotor and stator constant.

According to the size of the mould, the body 20 and, therefore, the massive structure 14, has different heights and thicknesses.

In particular, the body 20 may exhibit a thickness "S" greater than the thickness "s" of the poles 12. In such case the poles 12 will be completely covered by the elastomeric material of the body 20.

Principal advantage of the rotor obtained according to the present invention, is the silence the massive structure, defined by the body of uniform thickness "S" of elastomeric material and by the magnetic poles, exhibits at any rotation speed of the motor.

Furthermore, the rotor thus realised installed in a motor allows to obtain washing machines and similar machines of reduced acoustic emission during all the operation steps.

Another notable advantage of the rotor realised according to the present invention is that the continuous, massive structure allows to absorb and dissipate by elastic deformation possible vibrations of the rotor during the operation at any rotation speed.

A further considerable advantage of the present invention is that it may be realised at limited prices on a large and very large scale, another important advantage for an article intended to be used in products of wide consumption.

The invention claimed is:

1. A method for producing a rotor for an external rotor electric motor, wherein the method comprises the steps of:
providing a cup-shaped rotor support structure having a bottom and a side wall;
placing a plurality of magnetic poles in said cup-shaped rotor support structure, said magnetic poles arranged and distributed on said side wall in a circumferential pattern along said side wall, said magnetic poles being separated, along said circumferential pattern, by sections of predetermined width;
inserting a cylindrical mold portion into the cup-shaped rotor support structure to define a mold volume of uniform thickness between the cylindrical mold portion and said side wall;
inserting an elastomeric material in a liquid state into said mold volume to fill the sections of predetermined width between said magnetic poles;
hardening said elastomeric material to form a substantially annular massive structure of uniform thickness with the magnetic poles, said annular massive structure being integral with said cup-shaped rotor support structure; and
after hardening of said elastomeric material, removing said cylindrical core mold portion from said cup-shaped rotor support structure, such that said cup-shaped rotor support structure, said magnetic poles and said annular massive structure form the external permanent-magnet rotor.

2. The method according to claim 1, wherein said elastomeric material is cast into said mold volume.

3. The method according to claim 1, wherein said elastomeric material is injected into said mold volume at low pressure.

4. The method according to claim 1, wherein said elastomeric material is a polyurethane rubber.

5. The method according to claim 1, wherein the step of placing a plurality of magnetic poles comprises a step of attaching said magnetic poles to the side wall of the cup-shaped rotor support structure by interposition of glue, before the step of inserting an elastomeric material into the mold volume.

6. The method according to claim 1, wherein the cylindrical mold portion, when inserted into the cup-shaped rotor support structure, peripherally adheres to the magnetic poles, so that the thickness of the substantially annular massive structure is substantially equal to the thickness of the magnetic poles.

7. The method according to claim 1, wherein the periphery of the cylindrical mold portion, when inserted into the cup-shaped rotor support structure, is spaced apart from the magnetic poles, so that the thickness of the substantially annular massive structure is greater than the thickness of the magnetic poles, said magnetic poles being completely covered by the elastomeric material.

* * * * *